United States Patent Office 2,763,621
Patented Sept. 18, 1956

2,763,621
METHOD OF CONVERTING A LIQUID HYDROCARBON TO A GEL

George Shulman, Teaneck, N. J., assignor to Pfister Chemical Works, Inc., Ridgefield, N. J., a corporation of New Jersey No Drawing. Application December 7, 1951, Serial No. 260,579

6 Claims. (Cl. 252—316)

This invention relates to bodying or thickening agents for liquid hydrocarbons, more particularly to hydroxy aluminum soaps of improved effectiveness and methods of making them.

It is known that liquid hydrocarbons may desirably be thickened or converted into gels by the addition to the liquid hydrocarbon of an aluminum soap of fatty acids or a mixture of fatty and naphthenic acids. Such thickening is useful in the making of incendiaries and the like. These aluminum soaps may be prepared by adding to a solution of the sodium soap of the organic acid or acid mixture a solution of an aluminum salt, usually aluminum sulfate. If more than the theoretical amount of sodium hydroxide is used in forming the sodium soap, the final product will be a hydroxy aluminum soap. Furthermore, a wide variety of organic acids and mixtures thereof may be used in preparing the soaps. The invention is applicable to bodying agents of the hydroxy aluminum soap type, hereinafter sometimes referred to simply as aluminum soaps.

The invention resides in the discovery that the inclusion in a hydroxy aluminum soap bodying agent of a small quantity of an aromatic carboxylic acid of the formula

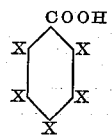

where at least 3 X's are H and the remaining two are H, or alkyl, alkoxy or COOH groups, very greatly increases its efficiency as a bodying agent for liquid hydrocarbons. The effectiveness of my improved agents, as indicated by mobilometer tests, may be as much as 100% greater than the corresponding agent without the aforesaid carboxylic acid.

In general, the amount of carboxylic acid to be added for maximum effectiveness with good solubility at room temperature will be of the order of 5% to 7% by weight of the total quantity of organic acids used in making the aluminum soap. There is no critical lower limit to the amount used since bodying efficiency increases with increasing amounts of the carboxylic acid from the least effective amount, say about 0.5%, up to about 5% to 7%, but efficiency falls off rather rapidly below about 2½ to 3%. Above 7%, solubility decreases rapidly, and higher temperatures are required to produce gelling. If solution is desired in the temperature range 65–85° F., 7% should be regarded as maximum because up to that amount the products of the invention dissolve rapidly and completely in that temperature range.

The increased effectiveness produced by the addition of the carboxylic acid manifests itself by an increase in the amount of thickening or an increase in the stiffness of gels produced per unit amount of bodying agent added to the liquid hydrocarbon. By enabling smaller quantities of agent to be used to produce a desired degree of thickening or gelation, obvious economies are effected.

As illustrative of how the invention may be practiced and the advantages thereof, reference is made to the following Examples 1–4.

In the case of each example, the formula set forth was made up both with and without the small quantity of carboxylic acid addition agent. The product resulting from each formula was tested in accordance with the following procedure:

18.6 gr. of the product was dissolved in 281.4 gr. of a standard test solvent composed of 57% n-heptane, 18% benzene, 20% cyclohexane and 5% iso-octane. The resulting gel was allowed to age for 24 hours. It was then transferred to a Gardner Mobilometer. Test weights were applied to the plunger and the results are expressed as the number of grams required to move the plunger 10 cm. in 100 sec. The higher the consistency of the gel, the greater the number of grams. (This is U. S. Government specification JAN-N-589 for Napalm Thickener which calls for solubility of the soap in the liquid hydrocarbons at 75°±10° F., a requirement met by all of the following examples.)

Example 1

To 180 grams of 10% NaOH aqueous solution the following acid mixture was added:

| | Grams |
|---|---|
| Coconut fatty acids | 28 |
| Oleic acid | 28 |
| Naphthenic acid | 9 |
| Benzoic acid | 4 |

The temperature was adjusted to 30° C. and a solution of 56 gr. of aluminum sulfate crystals in 125 cc. water was added in a period of one-half hour.

The precipitated aluminum soap was filtered, washed and dried at 70° C. The product was a granular material which dissolves readily in liquid hydrocarbons at room temperature.

The tests on the effectiveness of the above product were 700 grams Gardner as against 340 grams in the absence of the benzoic acid. 10.5 grams of the above product produced results equivalent to 18.6 grams of the product lacking benzoic acid.

Example 2

| | | |
|---|---|---|
| 10% caustic soda solution | lbs | 450 |
| Water | gals | 100 |
| Myristic acid | lbs | 100 |
| Stearic acid | lbs | 20 |
| Naphthenic acid | lbs | 50 |
| O-Toluic acid | lbs | 5 |

The o-toluic acid, it will be seen, was about 2.8% of the total acids. To the above solution, prepared as in Example 1, there was added slowly 140 lbs. of aluminum sulfate dissolved in 100 gals. water. The granular product was filtered, washed and dried to produce a hydrocarbon-soluble bodying agent.

The test results show 610 grams Gardner for the above formula as against 370 grams in the absence of the o-toluic acid and that 13.5 grams of the improved bodying agent was the equivalent of 18.6 grams of product lacking the addition agent.

Example 3

| | | |
|---|---|---|
| Caustic soda | gr | 18 |
| Water | cc | 645 |
| Coconut fatty acids | gr | 40 |
| Naphthenic acid | gr | 10 |
| Tall oil acids | gr | 20 |
| Anisic acid | gr | 5 |

To the above solution, prepared as in Example 1, there was added 54 gr. of aluminum sulfate dissolved in 200 cc.

of water. The product, after filtering, washing and drying, was a fine granular hydroxy aluminum soap.

Tests showed 590 grams Gardner for the formula containing the anisic acid against 320 grams without it and that 13.2 grams of the former was equivalent to 18.6 grams of the latter.

*Example 4*

| | Grams |
|---|---|
| 2% sodium hydroxide solution | 1000 |
| Coconut fatty acids | 28 |
| Oleic acid | 20 |
| Naphthenic acid | 16 |
| Phthalic anhydride | 3 |

To the above solution, prepared as in Example 1, there was added 86 gr. of aluminum sulfate dissolved in 150 cc. of water. The product was filtered, washed and dried.

Tests showed 740 grams Gardner for the formula containing phthalic anhydride against 360 grams without it and that 12.0 grams of the former was equivalent to 18.6 grams of the latter.

The particular mixtures of fatty acids or fatty acids and naphthenic acid are subject to wide variations in selection of the materials and their relative proportions, as has previously been known, while still producing satisfactory results. The variations in the basicity of the soap, which is dependent on the proportion of sodium hydroxide used, and in the components of the acid mixture affect such properties as the physical form of the end product, the rapidity of its solution in hydrocarbons, the stability of the product and the resistance of gels formed by its use to peptization which are factors already familiar to workers in the art. However, it has been found that the incorporation of the aforesaid aromatic carboxylic acids has in each case a highly beneficial and wholly unexpected effect in increasing the consistency of the thickened or gelled product for a given amount of agent used, regardless of the specific formulation of the other components of the hydroxy aluminum soap.

The naphthenic acid referred to in the examples is the complex acid mixture of commerce known by that name, not the pure hexahydrobenzoic acid. It is to be understood that it is not an essential ingredient since fatty acids alone may be used.

It is also to be understood that in place of the carboxylic acids themselves, as illustrated in Examples 1-3, their anhydrides may be used as being their full equivalents, as illustrated in Example 4. In some cases the anhydride may be the more readily available form.

Since the foregoing specific examples are subject to obvious modifications they are not to be taken as limitations of the invention as hereinafter defined in the claims.

What is claimed is:

1. The method of converting a normally light liquid hydrocarbon to a gel which comprises dissolving therein at room temperature a hydroxy aluminum soap of mixed organic acids from the group consisting of fatty acids and mixtures thereof with naphthenic acid to which has been added in the soap-forming stage, in an amount by weight of from about 2.8% to about 7% of the total quantity of organic acids used in making the soap, a material from the group consisting of aromatic carboxylic acids having the formula

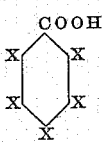

wherein at least three X's are H and the remaining two are from the group consisting of H, alkyl, alkoxy and COOH groups, and the anhydrides of such acids.

2. The method of claim 1 wherein the carboxylic acid is a toluic acid.

3. The method of claim 1 wherein the carboxylic acid is ortho toluic acid.

4. The method of claim 1 wherein the carboxylic acid is benzoic acid.

5. The method of claim 1 wherein the carboxylic acid is anisic acid.

6. The method of claim 1 wherein the carboxylic acid is phthalic anhydride.

References Cited in the file of this patent

UNITED STATES PATENTS

| 1,844,754 | Geller | Feb. 9, 1932 |
| 2,492,173 | Mysels | Dec. 27, 1949 |
| 2,570,990 | Southern et al. | Oct. 9, 1951 |
| 2,599,553 | Hotten | June 19, 1952 |
| 2,626,897 | Young et al. | Jan. 27, 1953 |